United States Patent [19]
Dillard et al.

[11] Patent Number: 5,092,923
[45] Date of Patent: Mar. 3, 1992

[54] COMPOSITION AND METHOD FOR COMBATTING CHLORIDE-INDUCED CORROSION IN STEEL IN REINFORCED CONCRETE

[75] Inventors: John D. Dillard; James O. Glanville, both of Blacksburg, Va.

[73] Assignee: Center for Innovative Technology, Herndon, Va.

[21] Appl. No.: 623,553

[22] Filed: Dec. 7, 1990

[51] Int. Cl.$^5$ ................................. C04B 9/02
[52] U.S. Cl. ...................... 106/14.05; 106/14.11
[58] Field of Search ............... 106/14.11, 14.45, 14.05, 106/14.21

[56] References Cited

U.S. PATENT DOCUMENTS

| | | | |
|---|---|---|---|
| 2,859,146 | 11/1958 | Prust | 106/14.11 |
| 3,380,836 | 4/1968 | Robinson | 106/14.39 |
| 3,829,395 | 8/1974 | Goodell | 106/14.24 |
| 3,976,484 | 8/1976 | Kudo et al. | 106/14.45 |
| 4,049,596 | 9/1977 | Traister et al. | 106/14.11 |

*Primary Examiner*—William R. Dixon, Jr.
*Assistant Examiner*—Margaret V. Einsmann
*Attorney, Agent, or Firm*—Parkhurst, Wendel & Rossi

[57] ABSTRACT

A composition and method for inhibiting chloride-induced corrosion in reinforcing steel (rebar) present in concrete structures such as roadways, bridges, and buildings. A boron-containing compound, such as a borate salt, is applied to the reinforced concrete structure. Application can be done by applying a mixture of road salt and the boron-containing compound or by applying a solution having the boron-containing compound to the concrete structure.

17 Claims, No Drawings

COMPOSITION AND METHOD FOR COMBATTING CHLORIDE-INDUCED CORROSION IN STEEL IN REINFORCED CONCRETE

The present invention is directed to a composition and method for combatting the chloride-induced corrosion of steel reinforcing bars in concrete in structures such as roadways and bridges caused by the chloride present in metal salts applied to deice those structures or in steel-reinforced concrete buildings that come into contact with metal salts.

BACKGROUND OF THE INVENTION

According to conservative estimates, as a consequence of their contamination by chloride salts, as many as one-half of all highway bridges in the United States are deteriorating due to reinforcing bar (rebar) corrosion. A similar situation prevails in the United Kingdom. Rebar corrosion in bridges is an outcome of the repeated wintertime application of deicing salts such as sodium chloride and calcium chloride. Chloride-induced corrosion destroys the rebar and causes formation of corrosion products. The corrosion products occupy a greater physical volume than the rebar itself and cause internal expansion which leads to cracking and spalling of the concrete cover. Once cracking and spalling have occurred, the rebar is accessible to further chloride-induced corrosion—and so conditions deteriorate rapidly. The principal factors that must be controlled to inhibit corrosion include oxygen, chloride ion, water, and pH. Approaches to control these factors have used inhibitors, electrochemical protection procedures, scavengers, buffers, and coatings.

The use of corrosion inhibiting agents is a traditional approach to preventing or slowing the corrosion of steel. Most corrosion inhibitors for steel find use in acidic or neutral conditions—where uninhibited attack may be very rapid; by comparison, corrosion of steel under alkaline conditions experienced by rebar in concrete is very slow. Because a long life is required of reinforced bridges and since corrosion is induced by chloride contamination, the use of corrosion inhibitors in protecting rebar is a natural consideration. At least two corrosion inhibitors are currently in use for the protection of rebar. The use of calcium nitrite in concrete mix has become fairly widespread during the past decade, and concrete made with added calcium nitrite has considerable resistance to chloride-induced corrosion. A different approach to inhibition of chloride-induced rebar corrosion involves the use of a corrosion-inhibiting additive as a minor component of the road salt. To this end, sodium monofluorophosphate has been employed.

DISCUSSION OF THE PRIOR ART

The problem of rebar corrosion caused by chloride salts in deicing compositions is known. U.S. Pat. No. 4,668,416 describes mixing a lignosulfate with a metal chloride salt in a dry weight ratio of about 1:15 to about 2:1 and restricting the pH of the mixture to a range from about 4:5 to about 8:5 to give a deicing composition with lowered roadway metal corrosion. In U.S. Pat. No. 4,824,588, a deicing composition is disclosed containing a lignosulfate, a metal chloride salt, and saccharinic acid. The composition is said to have an improved penetrating power over previous deicing compositions.

As mentioned above, calcium nitrite and sodium monofluorophosphate are also known as corrosion inhibitors.

Borates have been used previously as corrosion inhibitors in antifreeze/coolant compositions. See, for example, U.S. Pat. No. 4,613,445 describing an organophosphate-containing antifreeze having borates. See also British Patent 1,110,416 disclosing an ethylene glycol-containing composition including sodium tetraborate. Applicants are aware of no mention of borates used to inhibit chloride-induced corrosion of steel reinforcing bars in concrete prior to the present invention.

OBJECTS OF THE INVENTION

It is an object of the present invention to develop a method for dealing with the chloride-induced corrosion of rebar using a material that is cheap and readily available.

It is a further object of this invention to develop a composition and method for treating chloride-induced corrosion of rebar with a material that constitutes no danger to the environment, a material that is environmentally benign.

It is yet another object of the invention to provide a composition and method that will mitigate against rebar corrosion by providing a steady delivery of inhibitor to the rebar.

GENERAL DESCRIPTION OF THE INVENTION

Applicants have developed a composition and method for combatting chloride-induced corrosion of rebar meeting the foregoing objectives wherein the composition contains a corrosion inhibiting amount of a boron-containing material.

DETAILED DESCRIPTION OF THE INVENTION

Of the boron-containing material useful in the present invention, applicants have determined that particularly effective compounds include borate salts, more particularly, alkali metal and alkaline earth metal borates; boric acid and calcium and zinc borate and ammonium borates. Representative alkali metal and alkaline earth metal borates include sodium tetraborate, disodium octaborate, sodium perborate, sodium metaborate, potassium tetraborate, lithium metaborate, lithium tetraborate, barium metaborate, and zinc borate.

There are a number of ways in which the boron-containing material can be applied to roadway or bridge surfaces. One convenient manner of doing so is applying a dry deicing composition containing a metal chloride such as sodium chloride (also known as rock salt), calcium chloride, and magnesium chloride and a corrosion-inhibiting effective amount of the boron-containing compound. This composition is designed for application during the winter months when ice and snow are to be removed from the roadway surfaces.

Another approach that can be used is to apply a solution of the boron-containing material to a roadway, or indeed any other rebar containing concrete structure, as a prophylactic treatment or a treatment to address corrosion that is ongoing during that time of year when a deicing composition need not be applied or need not be required.

The following tests and analyses were carried out to determine corrosion inhibition of boron-containing compounds on reinforcing steel rods that are used in concrete structures.

Reinforcing steel rods (rebar) were produced by a single heat obtained from Roanoke Electric Steel Co., Roanoke, VA. The rod composition was formulated to be similar to material used 20 to 30 years ago. The vendor provided a bulk analysis of the rod material. The bulk analysis is summarized in the following table.

TABLE 1

| Element | Weight Percent |
|---------|----------------|
| C       | 0.22           |
| Fe      | 97.2           |
| P       | 0.018          |
| S       | 0.036          |
| Si      | 0.59           |
| Mn      | 1.00           |
| Al      | 0.006          |
| Cu      | 0.26           |

No analysis was made for the presence of O, N, Na, Ca, Zn, or Cd.

The rebar rods were ½" in diameter and 6 ft. long. The specimens were prepared by first cutting the bar in half longitudinally and cutting 1" specimens from the split bar. The rebar rods were cleaned in hexane and dried at 110° C.

Corrosion of rebar in chloride-contaminated concrete occurs where aqueous solutions within the pores of the concrete contact the rebar. The pore solutions are necessary to provide a conduit by which chloride ion may diffuse from the surface of the concrete to the rebars, several inches below the surface of the concrete. For the work here, a synthetic pore solution having a high concentration (3.5 w/w %) of NaCl was prepared.

Synthetic pore solution was prepared, by weighing on a laboratory balance, using reagent grade laboratory chemicals. The composition of the synthetic pore solution was chosen to be 0.300 M sodium hydroxide, 0.600 M potassium hydroxide, and saturated in calcium hydroxide in distilled water. Chloride-doped pore solution contained an additional 3.5% by mass of sodium chloride. Prior to use, all solutions were air saturated by passing air through them for one-and-a-half to two hours.

Rebar test specimens were prepared in replicate (usually 5 or 10 replicates per test) by placing approximately 10 ml of the aerated test solution in a small, plastic vial and putting a single rebar test piece into the solution. The rebar test pieces were completely submerged. The vials were loosely capped and placed in a laboratory oven and maintained at 60° C. Solutions were replenished periodically and replaced every two weeks.

From time to time, each test specimen was carefully examined with a 5× hand magnifying lens and graded on the basis of an estimate of the percentage of the surface corroded. The corrosion observations were made on the original (curved) surface of the rebar (not the freshly cut surface).

For experiments to test the comparative effect of inhibitors, accurately weighed quantities of the inhibitors were added to the chloride-doped simulated pore solution. Control solutions were chloride-doped pore solution without added corrosion inhibitor.

The preparation of rebar samples was described above. To facilitate the preparation of samples for surface analysis, a notch was cut in the 1" specimens at approximately ⅜" from one end of the specimen. After immersion in the inhibitor test solution, the ⅜" portion of the treated bar was separated from the 1" specimen and analyzed. By using this procedure the integrity of the treated rebar surface could be maintained, in that no cutting of the samples was required following treatment. The curved, outer portion of the rebar specimen was analyzed.

The test solutions were simulated pore solution (0.600M KOH; 0.300 M NaOH; saturated with Ca(OH)$_2$); pore solution containing 3.5%(w/w) NaCl; and pore solution containing 3.5%(w/w) NaCl and 0.3 M inhibitor. The inhibitors studied included calcium borate, sodium monofluorophosphate (Na$_2$PO$_3$F), and sodium tetraborate (Na$_2$B$_4$O$_7$).

The test solutions were aerated for at least one hour before rebar samples were introduced into the solutions. Exposure times were varied from one day to eight days. Samples were maintained at 60° C. The exposure procedure was to run five replicate samples of each exposure to provide data for statistical analysis of the results of exposure for individual samples.

The results are set out in the following table.

TABLE 2

The reported values are the averages of five replicate samples exposed to chloride-doped pore solution at 60° C. for the number of days stated. The inhibitor concentration was 0.002 M.

| Inhibitor | Exposure (days) | Percent Corrosion |
|-----------|-----------------|-------------------|
| Sodium monofluorophosphate | 28 | 5.4 |
| Sodium tetraborate | 28 | 5.6 |
| Calcium borate | 34 | 19.0 |
| Control (no inhibitor) | 35 | 26.0 |

Additional tests gave the following results.

A second test series was conducted using calcium borate as the inhibitor compared with second controls. This series showed an improvement of the inhibitor effect; the percent surface corrosion dropped to 6.6% relative to the controls at 11.4%. The results of a third and a fourth series of tests with calcium borate are shown in Table 3, indicating 3.5% and 8.4% surface corrosion, respectively, compared to the controls (identified as no inhibitor added) at 9.6%. The cause of these variations is not fully understood at this time. Certainly, statistical variations are well known to those who conduct corrosion tests; variability in the rebar test pieces may also contribute to the variability. Applicants do believe that the tested boron-containing compounds are effective inhibitors, however.

TABLE 3

| Inhibitor | | Sample #, visible corrosion surface areas (%) | | | | | | | |
|-----------|---|---|---|---|---|---|---|---|---|
|           |   | #1 | #2 | #3 | #4 | #5 | Avg % | $\sigma_{n-1}$ | vendor |
| Sodium Tetraborate | 10 Mol* | 3 | 6 | 2 | 1 | 2 | 2.8 | 1.9 | L |
| FIREBRAKE ZB (Zinc Borate) | | [<1] | 3 | 3 | 4 | 3 | 3.3 | 0.5 | U |
| Calcium Borate | | 4 | 3 | 3 | 4 | [40] | 3.5 | 0.6 | A |
| Sodium Tetraborate | 5 Mol | 9 | 5 | 3 | 1 | 6 | 4.8 | 3.0 | U |
| Ammonium Biborate | | 6 | [75] | 6 | 1 | 6 | 4.8 | 2.5 | U |
| Sodium Metaborate | 8 Mol | 11 | 1 | 1 | 7 | 7 | 5.4 | 4.3 | A |
| Boric Acid (Orthoboric) | | 8 | 1 | <1 | 17 | 2 | 5.6 | 7.1 | U |
| Zinc Borate | | 9 | 7 | 3 | 4 | 8 | 6.2 | 2.6 | A |

TABLE 3-continued

| Inhibitor | | Sample #, visible corrosion surface areas (%) | | | | | | | |
|---|---|---|---|---|---|---|---|---|---|
| | | #1 | #2 | #3 | #4 | #5 | Avg % | $\sigma_{n-1}$ | vendor |
| Sodium Tetraborate | 10 Mol | 4 | [70] | 7 | 7 | 10 | 7.0 | 2.4 | U |
| Sodium Tetraborate | 10 Mol | 18 | 2 | [50] | 2 | 8 | 7.5 | 7.5 | A |
| POLYBOR (Disodium Octaborate) | | 7 | 13 | 5 | 6 | [31] | 7.8 | 3.6 | U |
| Sodium Perborate | | 6 | 3 | 5 | 10 | 16 | 8.0 | 5.2 | A |
| Potassium Tetraborate | | [40] | 6 | 16 | 7 | 4 | 8.3 | 5.3 | U |
| Calcium Borate | | 20 | 3 | 16 | 3 | <1 | 8.4 | 8.9 | L/M |
| Sodium Metaborate | 8 Mol | 3 | 13 | 8 | 8 | 13 | 9.0 | 4.2 | U |
| NO INHIBITOR ADDED | | 28 | 13 | 2 | 3 | 2 | 9.6 | 11.3 | |
| Barium Metaborate | | 12 | 10 | 7 | 16 | 6 | 10.2 | 4.0 | A |
| Boric Acid (Orthoboric) | | 3 | 5 | 5 | 14 | 28 | 11.0 | 10.4 | L |
| Ammonium Pentaborate | | 2 | 15 | 25 | 10 | 4 | 11.2 | 9.3 | U |
| Sodium Metaborate | 4 Mol | 8 | 24 | 18 | 1 | 5 | 11.2 | 9.5 | A |
| Zinc Hexaborate | | 14 | 11 | 18 | 7 | 9 | 11.8 | 4.3 | A |
| Lithium Tetraborate | | 37 | 3 | 2 | 24 | 30 | 19.2 | 15.9 | A |
| Potassium Pentaborate | | 17 | 3 | 35 | 3 | 40 | 19.6 | 17.4 | U |
| Lithium Metaborate | | 33 | 27 | 10 | 4 | 55 | 25.8 | 20.2 | A |

Notes:
[1]Sample data enclosed in brackets have been excluded from computation of statistical mean and standard deviations (per ASTM E 178-80).
[2]Vendor symbols appearing after the Standard Deviation:
'A' means the Borate is a product of Johnson Matthey/ALFA Products
'U' means the Borate is a product of US Borax & Chemical Corp.
'L' means the Borate was on hand in the lab (Mostly Fisher Chemicals, except the Calcium Borate (Sample Code M) which is of unknown origin.)
*waters of hydration Tests were also carried out that showed borate salts are mobile and do not undergo degradation during transport through concrete and that borate inhibitors function by forming coatings on the rebar surface.

When the inhibitors are to be used for corrosion protection for rebar to be placed in newly manufactured concrete, the inhibitors are added to a wet concrete mixture in a quantity such that the boron (typically in the form of a borate salt) is in the range of from about 0.2 to about 5 pounds of elementary boron per 1000 pounds of concrete mixture. The preferred quantity is about 0.8 pounds of elementary boron per 1000 pounds of concrete mixture. The inhibitor may be added to the concrete mixture as a dry powder or in an aqueous solution.

When the inhibitor is to be used to mitigate the effects of rock salt or other chloride ion-containing deicer, the boron-containing compound (typically a borate salt) is added to the deicer in an amount of from about 0.1 to about 2.0 pounds of elementary boron per 100 pounds of chloride ion. The preferred quantity is about 0.6 pounds of elementary boron per 100 pounds of chloride ion.

When corrosion protection is to be provided to steel embedded in existing concrete structures, the preferred method of treatment is to apply an aqueous solution of a water-soluble boron-containing compound to the concrete surface. Highly water-soluble borate salts are naturally preferred for this application. The salt may be applied with mild heat because heat reduces the viscosity of the solution, enabling the solution better to permeate into the concrete through its pores. The precise concentration of the water-soluble boron compound is not critical. Useful solution concentrations of borate salts are from about 2% to about 15%, preferably about 10% by weight of the borate salt.

The foregoing description is not intended to place limits on the invention which should be evaluated in the sense of the attached claims.

What is claimed is:

1. A method of inhibiting chloride-induced corrosion of steel reinforcing bars in concrete structures containing same comprising applying to said concrete structure a chloride-induced corrosion inhibiting amount of a boron-containing compound selected from the group consisting of a borate salt or boric acid (orthoboric).

2. The method of claim 1, wherein said boron-containing compound is a borate salt.

3. The method of claim 2, wherein said borate salt is an alkali metal or an alkaline earth metal borate.

4. The method of claim 3, wherein said borate salt is selected from the group consisting of sodium tetraborate, calcium borate, sodium metaborate, disodium octaborate, sodium perborate, and potassium tetraborate.

5. The method of claim 2, wherein said borate salt is zinc borate.

6. The method of claim 2, wherein said borate salt is ammonium biborate.

7. The method of claim 1, wherein said boron-containing compound is boric acid (orthoboric).

8. The method of claim 1, wherein said concrete structure is a bridge deck.

9. The method of claim 1, wherein said concrete structure is a road.

10. The method of claim 1, wherein said boron-containing compound is in solution.

11. A composition for inhibiting chloride-induced corrosion of steel reinforcing bars in concrete roads or structures containing same comprising:
   sodium chloride or calcium chloride and
   a chloride-induced corrosion inhibiting effective amount of a boron-containing compound selected from the group consisting of a borate salt or boric acid (orthoboric).

12. The composition of claim 11, wherein said boron-containing compound is a borate salt.

13. The composition of claim 12, wherein said borate salt is an alkali metal or an alkaline earth metal borate.

14. The composition of claim 13, wherein said borate salt is selected from the group consisting of sodium tetraborate, calcium borate, sodium metaborate, disodium octaborate, sodium perborate, and potassium tetraborate.

15. The composition of claim 12, wherein said borate salt is zinc borate.

16. The composition of claim 12, wherein said borate salt is ammonium biborate.

17. The composition of claim 11, wherein said boron-containing compound is boric acid (orthoboric).

* * * * *